United States Patent Office 3,778,417
Patented Dec. 11, 1973

3,778,417
POLYAMIDE-IMIDE COMPOSITION CONTAINING P-TOLUENE SULFONIC ACID AS STRIPPING AGENT
Carl Serres, Jr., Naperville, and Benjamin A. Bolton, Winfield, Ill., assignors to Standard Oil Company, Chicago, Ill.
No Drawing. Original application Mar. 29, 1971, Ser. No. 129,110, now Patent No. 3,691,136. Divided and this application Apr. 7, 1972, Ser. No. 242,236
Int. Cl. C08g 20/32
U.S. Cl. 260—78 TF
1 Claim

ABSTRACT OF THE DISCLOSURE

Polyamide-imide compositions useful for film preparation are disclosed. These compositions comprise the polyamide-imide polymer, a solvent system for said polymer, and one of the following stripping agents: phosphoric acid, phosphites, esters of phosphoric acid and strong organic acids.

---

This is a division of application Ser. No. 129,110, filed Mar. 29, 1971 and now matured into U.S. Pat. 3,691,136.

This invention relates to aromatic polytrimellitamide-imide compositions useful for film preparations and, more particularly, relates to a polyamide-imide composition comprising said polyamide-imide polymer, a solvent system for said polymer, and one of the following stripping agents: phosphoric acid, phosphites, esters of phosphoric acid or strong organic acids.

The polymers may be described as polyamides having some polyimide linkages. Said polyamides are capable, when heated on a surface, of conversion to the polyamide-imide films. Such polyamides are high molecular weight polymeric compounds having in their molecules units of

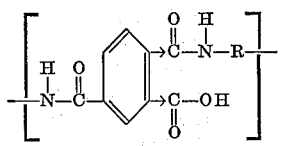

wherein → denotes isomerism and wherein R is a divalent aromatic organic radical. This organic radical consists of R', which is a divalent aromatic hydrocarbon radical or two R' divalent aromatic hydrocarbon radicals joined by stable linkages

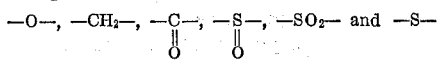

as are in the groups

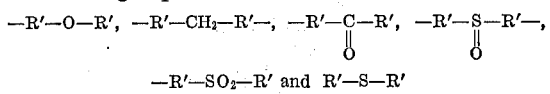

The molecular weight of these polyamides is sufficiently high to produce, upon heating on a surface, polyamide-imide films. Said polyamide-imide films consist essentially of recurring units of

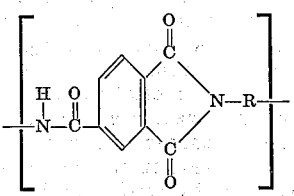

wherein R is a divalent aromatic organic radical in which, in addition to hyrogen, nitrogen, sulfur and oxygen atoms can be attached to the carbon atoms. This organic radical consists of R', which is a divalent aromatic hydrocarbon radical or two R' divalent aromatic hydrocarbon radicals joined by stable linkages

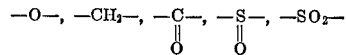

as are in the groups

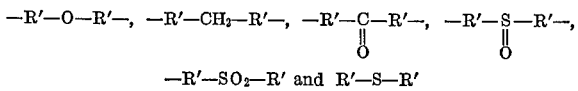

and R'—S—R'.

It has been found that the aforementioned polyamide-imide films can readily be separated from the surface on which they are cast and thus the utility of these films is impaired. This has been a serious drawback in the utilization of the polyamide-imide films. When the polyamide-imide polymers are prepared by reacting the acyl halide derivatives of trimellitic anhydride and an aromatic diamine in the presence of a solvent, the resulting films should be removable from the substrate on which it has been cast.

It has been discovered that when phosphoric acid, esters of phosphoric acid, phosphites or strong organic acids in 0.1 to 5.0 weight percent are added to the reaction solvent, preferably 1–3 weight percent, the resulting film can readily be removed from the substrate on which it has been cast. The stripping or release agents permit the facile stripping of fully cured amide-imide polymer films from various surfaces, particularly metal surfaces. Useful release agents besides phosphoric acid are esters of orthophosphoric acid; di-methyl, di-ethyl and di-octyl esters of pyrophosphoric acid; phosphites, including triphenyl phosphite, tributyl phosphite and strong organic acids, such as p-toluene/sulfonic acid.

The polyamide-imides are prepared by reacting an acyl halide derivative of benzene tricarboxylic acid anhydride and an aromatic diamine in the presence of organic solvents such as alkyl-substituted phenols, cresylic acid, ortho-meta- or para-cresol, and N,N-dimethylacetamide, N-methylpyrrolidone, N,N-dimethylformamide, dimethyl sulfoxide and the like. The reaction is suitably carried out at a temperature of about 0° to 150° C. advantageously at about 25 to 50° C. The structure of the amine also affects the rate of reaction. The reactants are preferably present in essentially an equimolar ratio. Variations with limits of plus or minus 3 mole percent of either starting material will usually have only minor effects on product property. Variations as high as plus or minus 10 mole percent may be suitable for less demanding applications than wire coating enamel from the standpoint of high flexural requirements. In a variation of this procedure, after the polymer has formed, water is added in about 1 to 5 weight percent. Alkaline oxide is then added, using from about 0 to 10% excess. The amount of alkaline oxide added is calculated from the acid titer value. The polymers as formed have an amide content which varies from 55 to 100% and the imide content is from 0 to 45 percent. The polyamide-imide after heat-curing theoretically contains 50 percent amide linkages and 50 percent imide linkages.

The first type of the polymers produced may be defined as those soluble in organic solvents and capable of further reaction upon application of heat.

The second type of polymers of the polyamide-imides are much less soluble than the amides and when they have been cast on surfaces and heat-cured, the resulting films are generally insoluble in organic solvents. These films are characterized by resistance to solvents, by high thermal stability and good electrical characteristics. These films, however, adhere to the surfaces on which they are cast and there is great difficulty in removing them intact from these surfaces. When, however, 0.1 to 5.0 weight percent of esters of phosphoric acid, phosphites, or strong organic acids are added to the solvent, the films can readily be removed from the surfaces.

The polyamide-imides can also be prepared by reacting trimellitic acid anhydride with diisocyanates in one of the aforementioned solvents at a temperature of about 150 to 300° F. The monomeric diisocyanates are reacted with trimellitic acid anhydride. The following are examples of useful diisocyanates: aliphatic diisocyanates such as butane-, hexane- and heptane diisocyanate, aliphatic diisocyanates with a built in ring system such as w,w'-diisocyanate-1,3 - dimethylbenzene, w,w' - diisocyanate-1,4-dimethylcyclohexane, w,w' - diisocyanate - 1,4-diethylbenzene and cyclohexane-1,3, - cyclohexane - 1,4-, 1-methylcyclohexane-2,4- and dicyclohexylethane 4,4'-diisocyanates. In addition, there may be mentioned mixed aromatic aliphatic and aromatic hydroaromatic diisocyanates such as 4-phenylisocyanate - methylisocyanate, tetrahydronaphthylene - 1,5, hexahydrobenzidine - 4,4'- and hexahydrodiphenylmethane - 4,4' - diisocyanates, also diisocyanates of benzene and its homologues; for example, 1,3-phenylene-, 1,4-phenylene-, 1-methylene - benzene - 2, 4- and 1-methylbenzene-2,6-diisocyanate and mixtures of their isomers, mono-, di- and triisopropyl- benzyl-diisocyanates, polyisocyanates of naphthalene of diphenyls and of di- and triphenylmethane with polynuclear ring systems or of polyphenyl compounds. Examples of the last mentioned classes of substances are naphthalene-1,4-, naphthalene-1,5, diphenyl-4,4'-, diphenylmethane-4,4'-, anthraquinone-2,6- and diphenylsulphide - 2,4 - diisocyanates, 4,4'-dimethyl - diphenylmethane - 2,2' - diisocyanates. The polyisocyanates used according to the invention may also be substituted by halogen-, alkoxy-, azo-, nitro-, cyano-, ester- or sulphonic groups. Examples of these are 1-chlorobenzene-, 1-nitrobenzene- and 1-methoxybenzene-2,4-diisocyanate and benzidine sulphonic-4,4'-diisocyanate. Polyarylpolyisocyanates are preferred. Advantageously, the isocyanato groups are in the meta or para position in the aromatic nucleus and particularly on separate rings when the nucleus has more than one aromatic ring. The preferred diisocyanates are 4,4 methylene bis phenyl-diisocyanate, 4,4 oxybis phenyl-diisocyanate, 1,4-phenyl diisocyanate, 1,3-phenyl diisocyanate, diphenylmethane 3,3'-diisocyanate, diphenylmethane, 4,4'-diisocyanate, diphenylether 3,3'-diisocyanate, diphenylether 4,4'-diisocyanate, naphthalene diisocyanate, diphenyl 1,4'-diisocyanate, diphenyl 1,3-diisocyanate, diphenylketone-3,3'-diisocyanate, diphenylketone 4,4'-diisocyanate.

The invention is further illustrated in the following examples:

EXAMPLE I

In this example, alkyl polyethyleneoxyphosphate ester acid was used as a release agent. This ester was added in the amount of 1 weight percent (based on polymer) to a solution of a polytrimellitamide-imide polymer prepared from the 4-acid chloride of trimellitic anhydride and methylene bis-aniline in N,N - dimethylacetamide (30% solids). This solution was spread onto various panels with a 0.006" x 3" Bird bar, then heated in a hot air oven for 30 minutes at 300° F., followed by 3 to 5 minutes at 600° F. These fully cured films were readily stripped from the following substrates: copper, aluminum, carbon steel and stainless steel. The films were about 2 mils thick.

EXAMPLE II

This example is a control. Example I was repeated except that no phosphate ester release agent was used. The cured films could not be stripped.

EXAMPLES III AND IV

Example I was repeated except that in Example III N-methylpyrrolidone was used as solvent and in Example IV butyrolactone was used as solvent. The fully cured films were readily stripped from the substrate.

EXAMPLE V

Example I was repeated using combination of alkylaryl- and alkylpolyethyleneoxy phosphate ester acids as release agents. The cured films were readily stripped.

EXAMPLE VI

Examples I, III and V were repeated using a polytrimellitamide-imide polymer prepared from 4-acid chloride of trimel-litic anhydride and oxybis-aniline. One to 3 weight percent of release agents were employed. The cured films were readily stripped.

EXAMPLE VII

One weight percent polymer of p-toluene sulfonic acid was added to a solution of polymer of Example I in butyrolactone solvent (30% solids). Films cast on stainless steel using the procedure of Example I were readily stripped.

EXAMPLE VIII

Three weight percent on polymer of p-toluene sulfonic acid was added to a solution of the polymer of claim 1 in a 3:1 N-methylpyrrolidone dimethyl acetamide solvent. The cured films were readily stripped from stainless steel.

EXAMPLE IX

One to 3 eight percent of orthophosphoric acid was added to the polymer of Example VI in N-methylpyrrolidone (25% solids). The cured films were readily stripped from aluminum, carbon steel and stainless steel.

EXAMPLE X

Example IX was repeated with similar results except that butyrolactone was used as the solvent.

EXAMPLE XI

Three weight percent on polymer of triphenyl phosphite was added to a solution of the polymer of Example VI in dimethyl acetamide. Cured films were readily stripped from aluminum and stainless steel.

EXAMPLE XII

Example XI was repeated with similar results but employed tributyl phosphite as stripping agent.

EXAMPLE XIII

Examples I and III were repeated with similar results but using a mixture of mono- and di-methyl esters of ortho-phosphoric acid as a release agent.

EXAMPLE XIV

Example XIII was repeated using a mixture of mono- and di-butyl esters of ortho-phosphoric acid. The films were readily stripped from the substrate.

EXAMPLE XV

Example XIV was repeated except that a mixture of mono- and di-iso amyl esters of ortho-phosphoric acid were used as stripping agent. The cured films similarly were readily stripped from the substrate.

EXAMPLE XVI

Example XIV was repeated except that a mixture of mono- and di-iso octyl esters of ortho-phosphoric acid were used as stripping agent. The cured films were readily stripped from the substrate.

EXAMPLE XVII

Examples XIII, XIV, XV and XVI were repeated using the polymer of Example VI and 1 to 3 weight percent of release agent. All the cured films readily stripped from the substrate.

EXAMPLE XVIII

One to 3 weight percent on polymer of the dimethyl ester of pyrophosphoric acid was added to a solution of the polymer of Example VI in N-methylpyrrolidone and the films were cast as shown in Example I. The cured films released readily from aluminum, carbon steel and stainless steel.

EXAMPLE XIX

Example XVIII was repeated except that in one instance diethyl ester of pyrophosphoric acid was used as a stripping agent and in the other, di-octyl pyrophosphoric acid was the stripping agent. The cured films released readily from the substrate.

EXAMPLE XX

A solution of 1 to 3 weight percent of the mixed mono- and di-butyl esters of orthophosphoric acid in methanol was applied to carbon or stainless steel panels and the excess of methanol evaporated to leave a thin, uniform layer of the ester. The polymer of Example VI in N-methylpyrrolidone solution containing no release agent was then coated on the prepared panel and cured as in Example I. The cured film was readily stripped.

EXAMPLE XXI

Example XX was repeated with similar results except that the stripping agents used were those employed in Examples I and V.

EXAMPLE XXII

Examples XX and XXI were repeated except using a polymer solution containing the same release agent as was also applied to the panels.

EXAMPLE XXIII

Examples XX, XXI and XXII were repeated with similar results using the polymer of Example I.

We claim:

1. A polyamide-imide composition useful for film preparation comprising (a) an amide-imide polymer prepared from trimellitic anhydride or an acid halide derivative of trimellitic anhydride and an aromatic diamine or trimellitic anhydride and an aromatic diisocyanate, (b) a solvent system for said polymer and (c) p-toluene sulfonic acid as stripping agent, wherein the amount of said stripping agent added varies from about 0.1 to about 5.0 percent by weight of the polyamide-imide composition.

References Cited
UNITED STATES PATENTS

| | | | |
|---|---|---|---|
| 3,620,996 | 11/1971 | Matsumura et al. | 260—47 |
| 3,691,136 | 9/1972 | Serres, Jr. et al. | 260—78 |
| 3,513,134 | 5/1970 | Filus | 260—78 |
| 3,242,128 | 3/1966 | Chalmers | 260—32.6 |
| 3,468,851 | 9/1969 | Yoda | 260—78 |
| 3,260,691 | 9/1966 | Savin | 260—30.2 |
| 3,546,152 | 12/1970 | Bolton | 260—29.2 |
| 3,554,984 | 1/1971 | George | 260—28 |

LESTER L. LEE, Primary Examiner

U.S. Cl. X.R.

117—132 B; 260—30.6 R, 30.8 R, 47 CB, 47 CP, 77.5 R